(12) United States Patent
Ono et al.

(10) Patent No.: US 6,288,474 B1
(45) Date of Patent: Sep. 11, 2001

(54) DRIVE DETECTION DEVICE FOR GYROSCOPE

(75) Inventors: Yasuichi Ono; Kazuo Hasegawa; Daisuke Takai, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/578,989

(22) Filed: May 25, 2000

(30) Foreign Application Priority Data

May 28, 1999 (JP) .................................................. 11-149806

(51) Int. Cl.[7] ...................................................... H01L 4/08
(52) U.S. Cl. ........................ 310/319; 73/505; 73/504.16; 310/366; 310/370
(58) Field of Search ................................. 310/321, 322, 310/366, 370, 316.01, 317, 319; 73/505, 504.04, 504.12, 504.15, 504.16

(56) References Cited

U.S. PATENT DOCUMENTS

| | | | | |
|---|---|---|---|---|
| 4,406,965 | * | 9/1983 | Ljung | 310/319 |
| 5,451,828 | | 9/1995 | Tomikawa et al. | |
| 5,635,786 | * | 6/1997 | Fujimoto et al. | 310/316.01 |
| 5,912,524 | * | 6/1999 | Ohnishi et al. | 310/321 |
| 5,942,839 | * | 8/1999 | Ohnishi et al. | 310/359 |
| 6,018,212 | * | 6/2000 | Kikuchi et al. | 310/321 |
| 6,134,963 | * | 10/2000 | Ishikawa et al. | 73/504.16 |

FOREIGN PATENT DOCUMENTS 8-233578    8/1996  (JP) .

* cited by examiner

*Primary Examiner*—Mark O. Budd
(74) *Attorney, Agent, or Firm*—Brinks Hofer Gilson & Lione

(57) ABSTRACT

A pair of electrodes are formed on the front surface and the rear surface of each vibrator in a longitudinal direction, and dielectric polarization is performed in the direction from the front surface to the rear surface. When I/V converters constituted by operational amplifiers are connected to electrodes of the middle vibrator, the detection electrodes can be grounded to a reference potential Vref through the imaginary short circuits of the I/V converters, so that a gyroscope can be vibrated without a conventional ground electrode. Therefore, the number of electrodes of the vibrators can be reduced, and an interval size between the drive electrodes or between the detection electrodes can be assured. For this reason, sufficient dielectric polarization can be performed when a high voltage is applied.

7 Claims, 5 Drawing Sheets

DRIVE DETECTION DEVICE FOR GYROSCOPE

BACKGROUND OF THE INVENTION

1. Field of the Invention

The present invention relates to a gyroscope used in a navigation system or the like and a drive detection device therefor and, more particularly, to a drive detection device for a gyroscope using a piezoelectric vibrator which can be easily manufactured by achieving a reduction of the number of electrodes and simplification of dielectric polarization.

2. Description of the Related Art

FIG. 4 is a perspective view showing a trident-type tuning fork piezoelectric vibrator as an example of a conventional vibratory gyroscope, and is of the same type as that of, e.g., a piezoelectric vibrator disclosed in Japanese Unexamined Patent Publication No. 9-101156. FIG. 5A is a front view obtained by viewing the piezoelectric vibrator shown in FIG. 4 in the direction of arrow V, and FIG. 5B is a front view showing a drive state.

In the piezoelectric vibrator shown in FIG. 4, three vibrators parallel separated from each other are formed at the distal end of an elastic plate entirely made of a piezoelectric material such as piezoelectric ceramic. In this piezoelectric vibrator, since the vibrators on both the sides vibrate in the same phase, the vibrators on both the sides are indicated by the same reference numeral 1. Since the middle vibrator vibrates in a phase different from the phases of the vibrators on both the sides, the middle vibrator is indicated by reference numeral 2 which is different from the reference numerals of the vibrators 1 on both the sides.

As shown in FIGS. 5A and 5B, electrodes 5a, 5b, and 5c are formed on front surfaces 1a of the left and right vibrators 1 on both the sides, and electrodes 6a, 6b, and 6c are formed on rear surfaces 1b. Electrodes 7a, 7b, and 7c are formed on a front surface 2a of the middle vibrator 2, and electrodes 8a, 8b, and 8c are formed on a rear surface 2b. As shown in FIG. 4, the respective electrodes extend along the direction of axis Z throughout the entire lengths of the vibrators 1 and 2 in the longitudinal direction.

The vibratory drive directions of the vibrators 1 and 2 is X directions (first directions). In the vibrators 1 and 2, when the X directions (first directions) which are vibratory drive directions are set to be directions of width, the electrodes 5a, 5c, 6a, 6c, 7a, 7c, 8a, and 8c are formed at both the edge portions of the vibrators 1 and 2 in the directions of width. The electrodes 5b, 6b, 7b, and 8b are located at the centers of the vibrators 1 and 2 in the directions of width (X directions).

FIG. 5A shows polarities of an applied electric field when dielectric polarization is performed to a piezoelectric material. DC voltages applied to respective electrodes are represented by + and −, and a ground potential is represented by G. In the vibrators 1 on both the sides, the electrodes 5b and 6b located at the centers in the directions of width on the front and rear surfaces have ground potentials. On the front surface 1a, a negative voltage is applied to the electrodes 5a and 5c located at both the edge portions in the directions of width. On the rear surface 1b, a positive voltage is applied to the electrodes 6a and 6c located at the edge portions in the directions of width. In the middle vibrator 2, the electrodes 7b and 8b located at the centers have ground potentials. On the front surface 2a, a negative voltage is applied to the electrodes 7a and 7c located at both the edge portions in the directions of width. On the rear surface 2b, a positive voltage is applied to the electrodes 8a and 8c located at both the edges in the directions of width. Arrows shown in FIG. 5A are directions of electric fields applied across the electrodes at this time, and dielectric polarization is performed along the electric field directions.

In this piezoelectric vibrator, the electrodes 6b and 8b of the vibrators 1 and 2 are used as detection electrodes. The detection electrodes 6b and 8b are formed on surfaces (1b, 2b) extending the X directions (first directions) on the vibrators 1 and 2 and formed at the central positions in the directions of width of the X directions. In the vibrator 1, dielectric polarization directions on the left and right of the X directions are symmetrical with respect to the portion of the detection electrode 6b. Similarly, in the vibrator 2, dielectric polarization directions are symmetrical on the left and right of the X directions with respect to a portion where the detection electrode 8b.

In FIG. 5B, the phases of AC drive voltages applied to the respective electrodes are represented by signs + and −. When sign + is expressed on a certain electrode, and sign − is expressed on the other electrode, it means that AC drive voltages having a phase difference of 180° ($\pi$) are applied to both the electrodes. Mark o in FIG. 5B represents plus distortion (extension) caused by the piezoelectric effect, and mark x represents minus distortion (contraction).

In the drive method in FIG. 5B, the electrodes 5b, 6a, 6c, 7b, 8a, and 8c are grounded. The electrodes 5a, 5c, 7a, and 7c are drive electrodes located on the front surfaces 1a and 2a of the vibrators 1 and 2, and the electrodes 6b and 8b located at the centers of the rear surfaces 1b and 2b.

As an AC drive power, voltages which are in-phase are applied to the electrodes 5c and 7a, and voltages which are in-phase (opposite from the above phase) are applied to the electrodes 5a and 7c. As a result, on the surfaces 1a of the vibrators on the left and right, at a certain point of time, plus distortion o occurs between the electrodes 5a and 5b, and minus distortion x occurs between the electrodes 5b and 5c. In the middle vibrator 2, on the front surface 2a, minus distortion x occurs between the electrodes 7a and 7b, and plus distortion o occurs between the electrodes 7b and 7c. Therefore, at a certain point of time shown in FIG. 5B, bending vibration occurs such that the amplitude directions of the vibrators 1 on both the sides are set to be a +X direction, and the amplitude of the middle vibrator 2 is performed in a −X direction. More specifically, the vibrators 1 on both the sides and the middle vibrator 2 vibrate with phases opposite from each other in the X directions.

When the piezoelectric vibrator is placed in a rotation system rotated about axis Z, force in Y directions (second directions) which are orthogonal to the vibration direction works due to Coriolis force. Since the left and right vibrators 1 and the middle vibrator 2 are vibratorily driven with phases opposite from each other in the X directions, the vibration components generated by Coriolis force are opposite from each other in phase in the vibrators 1 on both the sides and the middle vibrator 2. For example, when the amplitude direction of the vibrators 1 on both the sides is a +Y direction at a certain point of time, the amplitude direction of the middle vibrator 2 is a −Y direction.

Vibration components generated by the Coriolis force are obtained from the detection electrodes 6b and 8b formed at the centers of the rear surfaces 1b and 2b of the vibrators 1 and 2 in the directions of width.

In the vibration component of each vibrator generated by Coriolis force, when the amplitude direction of the vibrators 1 is the +Y direction at a certain point of time, the piezoelectric materials of the portions of the detection electrodes 6b "extends". The amplitude direction of the middle vibrator 2 becomes the −Y direction, and the piezoelectric material of the portion of the detection electrode 8b "contracts". Since all the dielectric polarization directions of the portions where the detection electrodes 6b, 8b, and 6b are formed are equal to each other, current outputs I1 and I2 of the detection electrodes 6b are in-phase as the vibration components of the vibrators in the Y directions. In contrast to this, a current output I3 of the detection electrode 8b is detected to have a phase opposite from the phase of the current outputs I1 and I2.

However, in the conventional piezoelectric vibrator, a pair of drive electrodes 5a and 5c, a pair of drive electrodes 7a and 7c, output electrodes 6a and 6c, and output electrodes 8a and 8c are formed on the front surfaces 1a and 2a and the rear surfaces 1b and 2b of the vibrators 1 and 2, respectively, and the ground electrodes 5b and 7b and the detection electrodes 6b and 8b are formed between the pair of drive electrodes and between the pair of drive electrodes, respectively, and six electrodes must be formed on both the front and rear surfaces of one vibrator. Therefore, dielectric polarization and steps in manufacturing the electrodes are cumbersome, and wires connected to the electrodes are complex.

The electrodes formed on the front surfaces 1a and 2a and the rear surfaces 1b and 2b of the vibrators have a structure in which the electrodes are very close to each other to have a small interval size (creeping distance).

As shown in FIG. 5A, dielectric polarization in each vibrator is generated by applying a high voltage across the electrodes. However, when the interval size between the electrodes is small as described above, and the shapes of the electrodes are not uniform, the following problems are posed. That is, discharge caused by dielectric breakdown is generated at the nonuniform portion when a high voltage is applied, and the electrodes are broken. When dielectric polarization is generated at a low voltage to prevent the electrodes from being broken, the problem that the dielectric polarization is not sufficiently performed is posed.

More specifically, due to a tolerance generated when the electrodes are formed, the electrodes cannot be avoided from being formed and biased in any one direction of the X directions, it is difficult to make the dielectric polarizations on both the sides of each electrode completely symmetrical. Therefore, a direction in which a detection electrode is biased by an error in manufacturing cannot be predicted, and an error of the symmetry of the dielectric polarization directions cannot be also predicted.

Therefore, polarities of the vibration components output from the detection electrodes in the X directions are random, the polarities with which the vibration components are generated cannot be predicted. For this reason, when the current outputs I1, I2, and I3 from the detection electrodes are given to the detection circuit described above, the current outputs may be amplified by adding the vibration components in the X directions, or may be decreased by subtracting the vibration components. More specifically, when the positions at which the detection electrodes are formed have errors, amounts of vibration component in the X directions included in the detection output cannot be predicted until the piezoelectric vibrator is actually operated. For this reason, the detection accuracy of Coriolis force becomes low, and sensitivity for detecting an angular velocity X about axis Z is low.

SUMMARY OF THE INVENTION

The present invention is to solve the above conventional problems, and has as its object to provide a drive detection device for a gyroscope which can drive a piezoelectric vibrator having a reduced number of electrodes.

The present invention also has as its object to provide a drive detection device for a gyroscope which can drive vibrators which easily generate dielectric polarization.

The present invention also has as its object to provide a drive detection device for a gyroscope which can cancel amplitude components in amplitude directions of the vibrators when the number of electrodes of the vibrators is reduced.

The present invention provides a drive detection device for a gyroscope including at least one vibrator which has a pair of drive electrodes extending in a longitudinal direction on one surface and a pair of detection electrodes extending in the longitudinal direction on the other surface and which is dielectric-polarized in one direction between one surface and the other surface, comprising a drive system for giving drive signals opposite from each other in phase to the pair of drive electrodes, and a detection system including a pair of I/V conversion means for respectively converting current outputs detected from the pair of detection electrodes into voltage outputs and addition means for adding voltage outputs of the I/V conversion means.

According to the present invention, the pair of detection electrodes are formed on one surface (front surface) of the vibrator, and the two detection electrodes are formed on the other surface (rear surface). For this reason, an interval size (creeping distance) between the electrodes which is larger than that of a conventional vibrator in which at least three electrodes are formed can be assured. Therefore, even if a high voltage is applied across the electrodes, the electrodes can be prevented from being easily broken, the dielectric polarizations can be formed to design.

As electrodes formed in one vibrator, 4 electrodes are satisfactorily used. Also in a vibrator in which detection electrodes on both the sides of the vibrator are directly connected to a reference potential, only one electrode may be arranged on the detection side. In this case, as only the electrodes on both the sides, at least three electrodes may be arranged. For this reason, the electrodes can be manufactured easier than conventional electrodes, and a wiring process for the electrodes is not complex.

In addition, in a piezoelectric vibrator in which only one dielectric polarization direction may be used, when a high voltage is applied from one surface (front side) to the other surface (rear side), dielectric polarization can be easily generated, and the states of dielectric polarizations between the vibrations can be made uniform. A piezoelectric material in which dielectric polarization is also formed in one direction can be used as a piezoelectric vibrator.

Therefore, as current outputs output from the detection electrodes, outputs which have a small amplitude difference and are almost uniform can be obtained. Therefore, the detection accuracy for Coriolis force is also high, and the sensitivity for detecting an angular velocity w about axis Z can be made high.

The present invention provides a drive detection device for a gyroscope including at least one vibrator which has first and second drive electrodes extending in a longitudinal direction on one surface and first and second detection electrodes extending in the longitudinal direction on the other surface and which is dielectric-polarized between the surface and the other surface, comprising a circuit of a drive system for generating drive signals being in-phase to the first and second drive electrodes, and a detection system having a pair of I/V conversion means for respectively converting current outputs detected from the first and second detection electrodes into voltage outputs and differential amplification means for subtracting voltage outputs of the I/V conversion means from each other.

A drive detection device wherein a piezoelectric vibrator is formed such that a dielectric polarization direction between the first drive electrode and the first detection electrode and a dielectric polarization direction between the second dielectric electrode and the second detection electrode are opposite from each other in phase, and is formed such that a dielectric polarization direction between the first drive electrode and the second drive electrode and a dielectric polarization direction between the first detection electrode and the second detection electrode are opposite from each other in phase is preferable.

A drive detection device wherein dielectric polarization directions of adjacent vibrators are opposite from each other in phase is preferable.

In the above configuration, the vibrators at both the ends and the middle vibrator can be alternately vibrated by one AC drive signal. Therefore, the circuit configuration of the drive system can be simplified.

A drive detection device wherein one surface of each vibrator is constituted by only a drive electrode, and the other surface is constituted by only a detection electrode.

Since the drive system and the detection system can be apparently discriminated from each other, wiring can be easily performed, and erroneous wiring can be immediately detected by leads painted in different colors.

DESCRIPTION OF THE PREFERRED EMBODIMENTS

The present invention will be described below with reference to the drawings.

Figure 1:
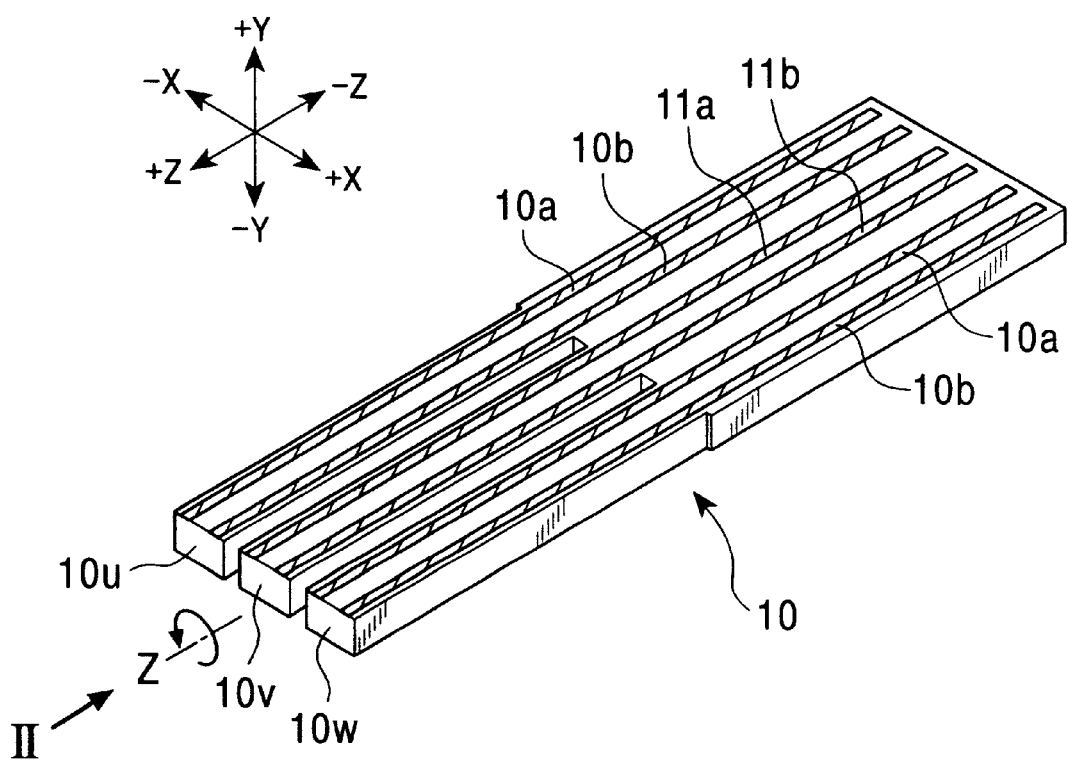
FIG. 1 is a perspective view of a piezoelectric vibrator in a gyroscope according to the present invention.
Figure 2A:
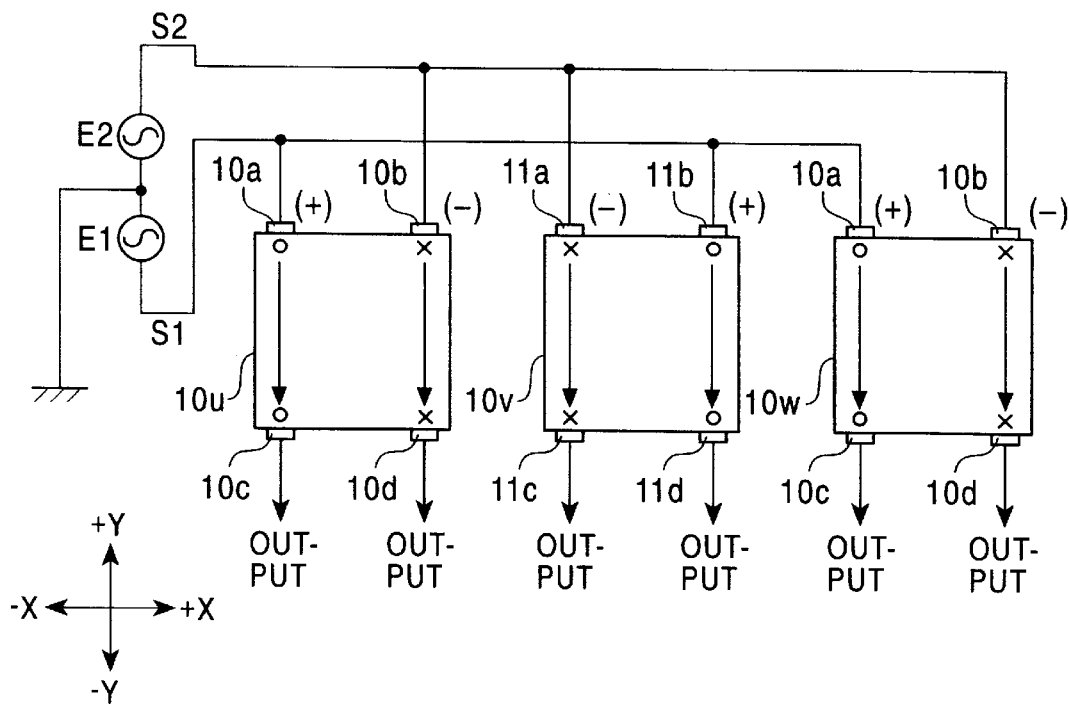
FIG. 2A is a front view of a piezoelectric vibrator showing polarization directions and the electric wiring configuration of a drive system as the first embodiment of the present invention.
Figure 2B:
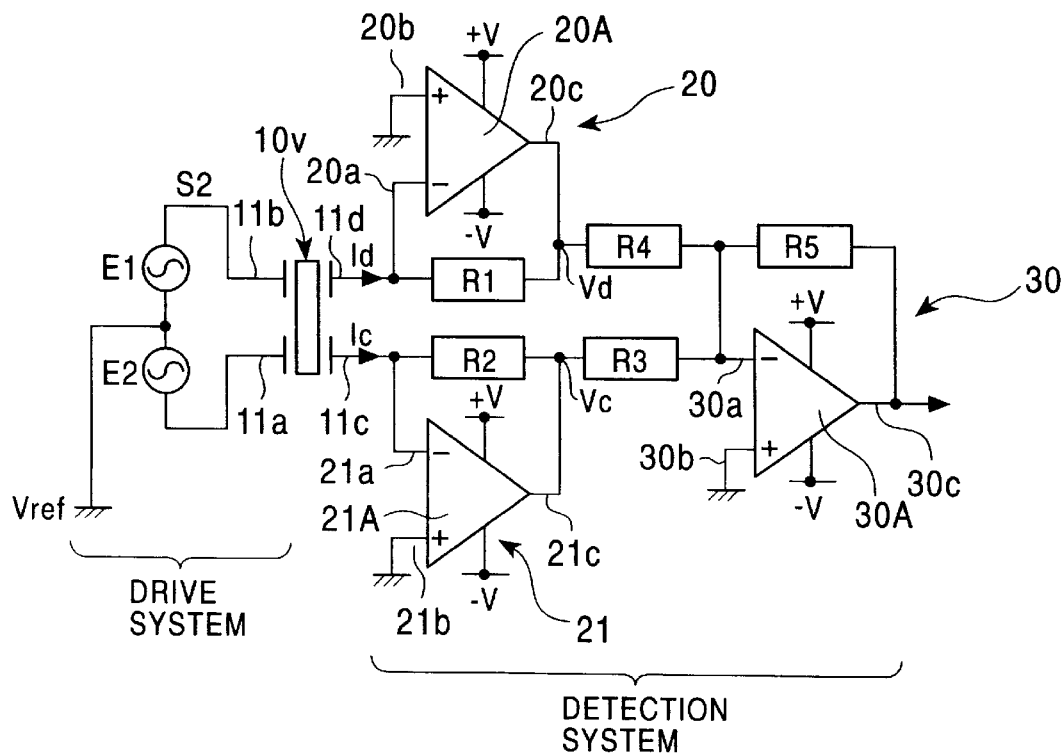
FIG. 2B is a connection diagram between a middle vibrator shown in FIG. 2A and the circuit configuration of a detection system.

FIG. 1 is a perspective view of a piezoelectric vibrator in a gyroscope according to the present invention. FIG. 2A shows, as the first embodiment of the present invention, polarization directions and the electric wiring configuration of a drive system, i.e., a front view of the piezoelectric vibrator in the direction of arrow II in FIG. 1. FIG. 2B is a connection diagram between a middle vibrator shown in FIG. 2A and the circuit configuration of a detection system.

In a piezoelectric vibrator 10 shown in FIG. 1, three vibrators 10$u$, 10$v$, and 10$w$ which are parallel separated from each other are formed at the distal end (+Z side) of an elastic plate made of a piezoelectric material such as piezoelectric as a whole.

As shown in FIG. 1 and FIG. 2A, drive electrodes 10$a$ and 10$b$ are parallel formed on the front surfaces (+Y side) of the vibrators 10$u$ and 10$w$ on both the left and right sides, and electrodes 10$c$ and 10$d$ are parallel formed on the rear surfaces (−Y side). On the other hand, electrodes 11$a$ and 11$b$ are formed on the front surface of the middle vibrator 10$v$, and electrodes 11$c$ and 11$d$ are parallel formed on the rear surface. The electrodes extend along the longitudinal direction (direction of axis Z) of the piezoelectric vibrator 10 throughout the entire lengths of the vibrators 1 and 2 in the longitudinal direction.

As shown in FIG. 2A, dielectric polarization directions in the piezoelectric vibrator 10 are formed in the same direction in all the vibrators 10$u$, 10$v$, and 10$w$, i.e., in a direction from the upper surface (+Y side) to the rear surface (−Y side). The dielectric polarization directions may be formed in a direction from the rear surface (−Y side) to the front surface (+Y side).

As shown in FIG. 2A, the electrodes 10$a$ and 11$b$ on the front surface sides of the vibrators 10$u$, 10$v$, and 10$w$ are connected to an AC drive signal source E1. The electrodes 10$b$ and 11$a$ are connected to an AC drive signal source E2. More specifically, the electrodes 10$a$, 10$b$, 11$a$, and 11$b$ are electrodes on the drive side. On the other hand, all the electrodes 10$c$, 10$d$, 11$c$, and 11$d$ on the rear surface sides of the vibrators 10$u$, 10$v$, and 10$w$ are used as electrodes on the detection side.

As shown in FIG. 2B, the drive system are constituted by the AC drive signal sources E1 and E2 which are signal lines having phases which are opposite from each other and different from each other by 180°. On the other hand, the detection system is constituted by two I/V conversion means 20 and 21 and one addition means 30.

The I/V conversion means 20 and 21 are mainly constituted by operational amplifiers 20A and 21A such as op-amplifiers. The operational amplifiers 20A and 21A have inversion terminals (− terminals) 20$a$ and 21$a$, non-inversion terminals (+ terminals) 20$b$ and 21$b$, and output terminals 20$c$ and 21$c$, respectively, and the electrodes 11$d$ and 11$c$ of the vibrator 10$v$ are connected to the inversion terminals 20$a$ and 21$a$ of the operational amplifiers 20A and 21A, respectively.

Resistors R1 and R2 are inserted between the inversion terminals (− terminals) 20$a$ and 21$a$ and the output terminals 20$c$ and 21$c$ of the operational amplifiers 20A and 21A, respectively. The non-inversion terminals (+ terminal) 20$b$ and 21$b$ are connected to a reference potential Vref such as the ground. However, the non-inversion terminals (+ terminal) 20$b$ and 21$b$ need not be grounded, and may be connected to an invariant potential.

Input impedances between the inversion terminal 20$a$ and the non-inversion terminal 20$b$ of the operational amplifier 20A and between the inversion terminal 21$a$ and the non-inversion terminal 21$b$ of the operational amplifier 21A are extremely high on the characteristics of the operational amplifiers. On the other hand, since imaginary ground (imaginary short circuit) states are established between the inversion terminal 21$a$ and non-inversion terminal 20$b$ and between the inversion terminal 21$a$ and the non-inversion terminal 21$b$, the potentials of the inversion terminals 20$a$ and 21$a$ are set to be the reference potential Vref. More specifically, the impedances between the electrodes 11c and 11d and the reference potential Vref are extremely high, and a current does not easily flow therebetween. However, the potentials of the electrodes 11c and 11d are set to be the same potentials.

On the other hand, the addition means 30 is mainly constituted by an operational amplifier 30A having an inversion terminal (− terminal) 30a, a non-inversion terminal (+ terminal) 30b, and an output terminal 30c. A resistor R5 is arranged between the inversion terminal 30a and the output terminal 30c. The non-inversion terminal 30b is connected to the reference potential Vref. The output terminal 20c of the operational amplifier 20A and the inversion terminal 30a of the operational amplifier 30A are connected to each other through a resistor R4. The output terminal 21c of the operational amplifier 21A and the inversion terminal 30a of the operational amplifier 30A are connected to each other through a resistor R3.

The electrodes 10c and 10d of the vibrators 10u and 10w on both the sides may constitute a detection system constituted by the I/V conversion means 20 and 21 and the addition means 30 like the middle vibrator 10v. The electrodes 10c and 10d may also be connected to the reference potential Vref.

In the following description, a drive detection device for a gyroscope will be described below on the assumption that the electrodes 10c and 10d of the vibrators 10u and 10w on both the sides are connected to the reference potential Vref.

AC drive signals S1 and S2 are supplied from the AC drive signal sources E1 and E2 to the electrodes 10a and 11b and the electrodes 10b and 11a of the piezoelectric vibrator 10. In the vibrators 10u and 10w on both the sides, the AC drive signal sources E1 and E2 form loops constituted by the AC drive signal sources E1 and E2→the electrodes 10a and 10b→the vibrators (10u, 10w)→electrodes 10c and 10d→the reference potential Vref→the AC drive signal sources E1 and E2, respectively. On the other hand, in the middle vibrator 10v, loops constituted by the AC drive signal sources E1 and E2→the electrodes 11b and 11a→the vibrator 10v→the electrodes 11d and 11c→the inversion terminal 20a of the operational amplifier 20A and the inversion terminal 21a of the operational amplifier 21A→the non-inversion terminal 20b of the operational amplifier 20A and the non-inversion terminal 21b of the operational amplifier 21A→the reference potential Vref→the AC drive signal sources E1 and E2 are established.

Here, the phases of the AC drive signals S1 and S2 at a certain point of time are represented by (+) and (−). These signs are added to the electrodes on the drive side. More specifically, when (+) is added to an electrode, the electrode has a potential higher than the reference potential Vref. When (−) is added to an electrode, the electrode has a potential lower than the reference potential Vref. As in the above description, mark o represents plus distortion (extension) caused by the piezoelectric effect, and mark x represents minus distortion (contraction).

As shown in FIG. 2A, when the AC drive signals S1 and S2 at a certain point of time are (+) and (−), respectively, the electrodes 10a and 11b become (+), and the electrodes 10b and 11a become (−).

As a result, on the front surfaces of the vibrators 10u and 10w on the left and right sides, at a certain point of time, plus distortion o occurs on the electrode 10a side, and minus distortion x occurs on the electrode 10b side. On the front surface of the middle vibrator 10v, minus distortion x occurs on the electrode 11a side, and plus distortion o occurs on the electrode 11b side. Therefore, at a certain point of time shown in FIG. 2A, bending vibration occurs such that the amplitude directions of the vibrators 10u and 10w on both the sides are set to be a +X direction, and the amplitude of the middle vibrator 10v is performed in a −X direction. More specifically, the vibrators 10u and 10w on both the sides and the middle vibrator 2 can be vibrated with phases opposite from each other in the X directions.

At this time, current outputs Ic and Id are detected from the electrodes 11c and 11d on the detection side. More specifically, it is assumed that the amplitude direction of the middle vibrator 10v vibrates in the −X direction at a certain point of time. At this time, minus distortion x occurs on the electrode 11c side, and plus distortion o occurs on the electrode 11d side. In addition, the left and right polarization directions are equal to each other, the current output Ic of the electrode 11c and the current output Id of the electrode 11d are opposite from each other in phase.

Since the electrodes 11c and 11d are formed on the same vibrator 10v, when the vibrator 10v is driven in the X directions, X-direction in-phase drive components are superposed on the current outputs Ic and Id.

When the gyroscope is placed in a rotation system rotated about axis Z, Coriolis force works in the Y directions (second directions) which are orthogonal to the vibration directions (X directions). Since the vibrators 10u and 10w on both the sides and the middle vibrator 10v are vibrated with phases opposite from each other in the X directions, amplitude components generated by Coriolis force in the Y directions are different in phase in the vibrators 10u and 10w on both the sides from in the middle vibrator 10v. Therefore, for example, when the amplitude directions of the vibrators 10u and 10w on both the sides at a certain point of time are set to be the +Y direction, the amplitude direction of the middle vibrator 10v becomes the −Y direction.

Therefore, at a point of time at which Coriolis force works in the +Y direction in the piezoelectric vibrator 10 placed in a rotation system, when the amplitude direction of the middle vibrator 10v vibrates in the −X direction, minus distortion x caused by contraction in the −X direction and plus distortion o caused by extension in the +Y direction occur on the electrode 11c side. On the other hand, plus distortion o caused by extension in the −X direction and plus distortion o caused by extension in the +Y direction occur on the electrode 11d side. More specifically, the current outputs Ic and Id include amplitude components in the X directions and components of Coriolis force in the Y directions.

The current outputs Ic and Id of the electrodes 11c and 11d are converted into voltage outputs Vc and vd by the I/V conversion means 20 and 21. Since the impedances of the operational amplifiers 20A and 21A themselves are extremely high, all the current outputs Ic and Id flow into the resistors R1 and R2. Therefore, in the I/V conversion means 20 and 21, the current outputs Ic and Id are converted into the voltage outputs Vc and Vd which are expressed by: Vc=−Ic·R2 and Vd=−Id·R1. If R1=R2=R is satisfied, Vc=−Ic·R and Vd=−Id·R are satisfied.

These voltage outputs Vc and Vd are added and amplified in the addition means 30, and an output Vout from the addition means 30 is given by:

$$Vout = (Vc + Vd) \cdot R5/R4$$
$$= ((-Ic \cdot R) + (-Id \cdot R)) \cdot R5/R4$$

-continued $$= -(Id + Ic) \cdot R \cdot R5/R4.$$

However, since the current output Id and the current output Ic are different from each other in phase by 180°, as a result, the output Vout is eventually obtained by amplifying (R·R4/R4) times) the difference between the current output Id and the current output Ic. When the current output Id and the current output Ic are added to each other by the addition means 30, drive components which are in-phase, included in the current outputs Ic and Id, and generated by vibration in the X directions can be canceled.

Since the dielectric polarization directions of the piezoelectric vibrator 10 may be uniform in one direction, a material such as quartz having spontaneous polarization can be directly used as a material of a vibrator.

Figure 3A:
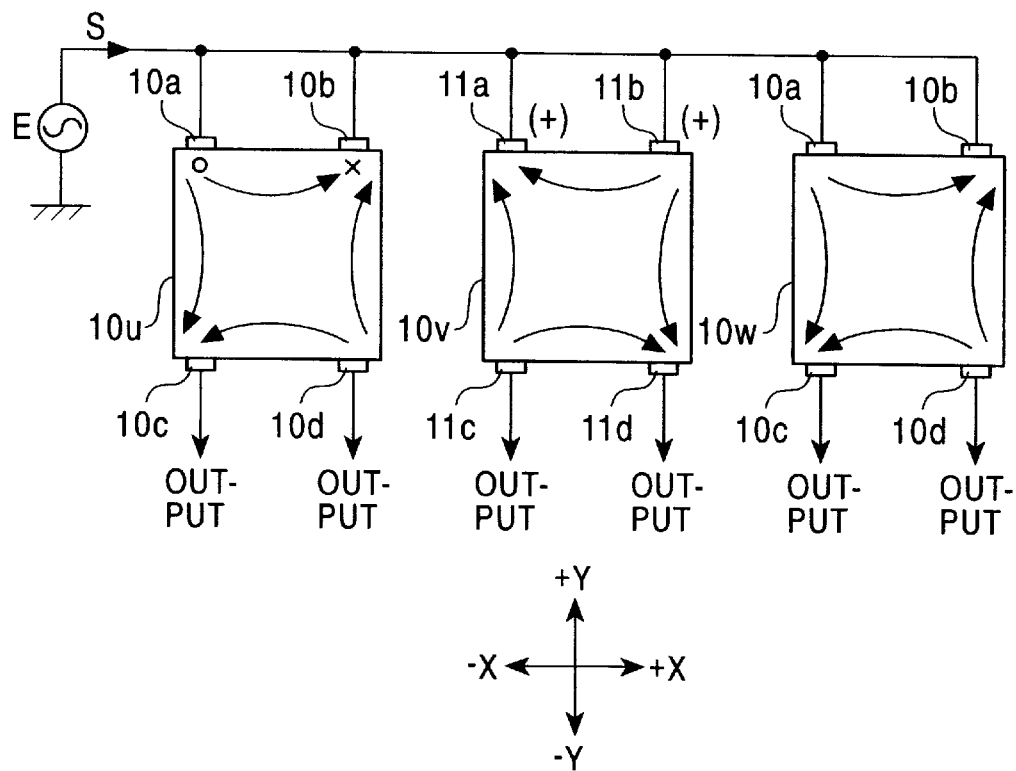
FIG. 3A is a front view of a piezoelectric vibrator showing dielectric directions and the electric wiring configuration of a drive system as the second embodiment of the present invention.
Figure 3B:
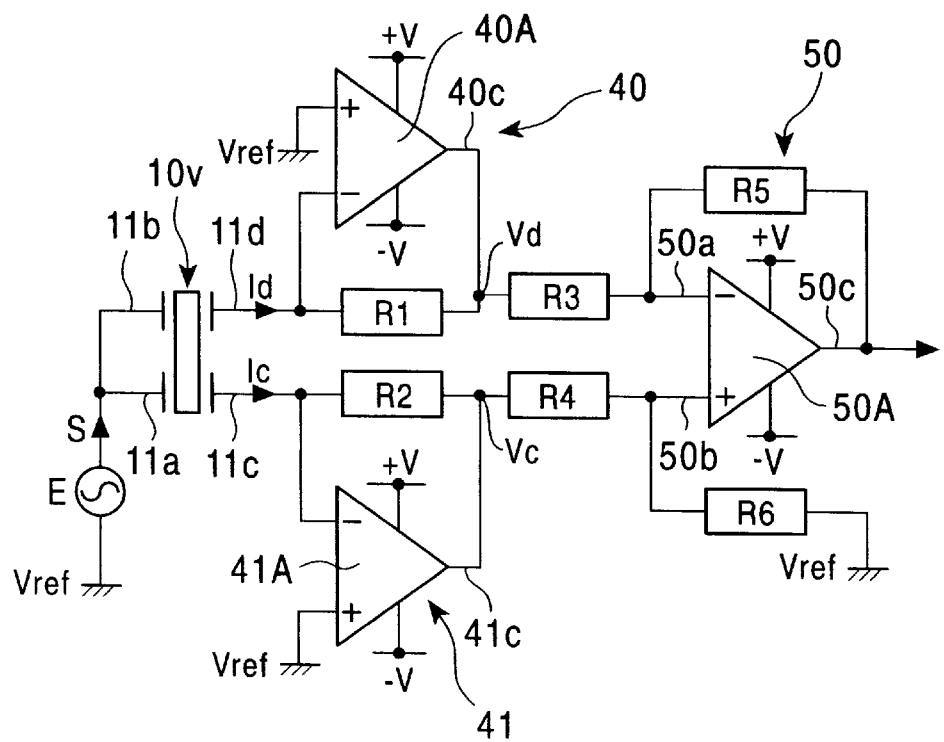
FIG. 3B is a connection diagram between a middle vibrator shown in FIG. 3A and the circuit configuration of a detection system.
Figure 4:
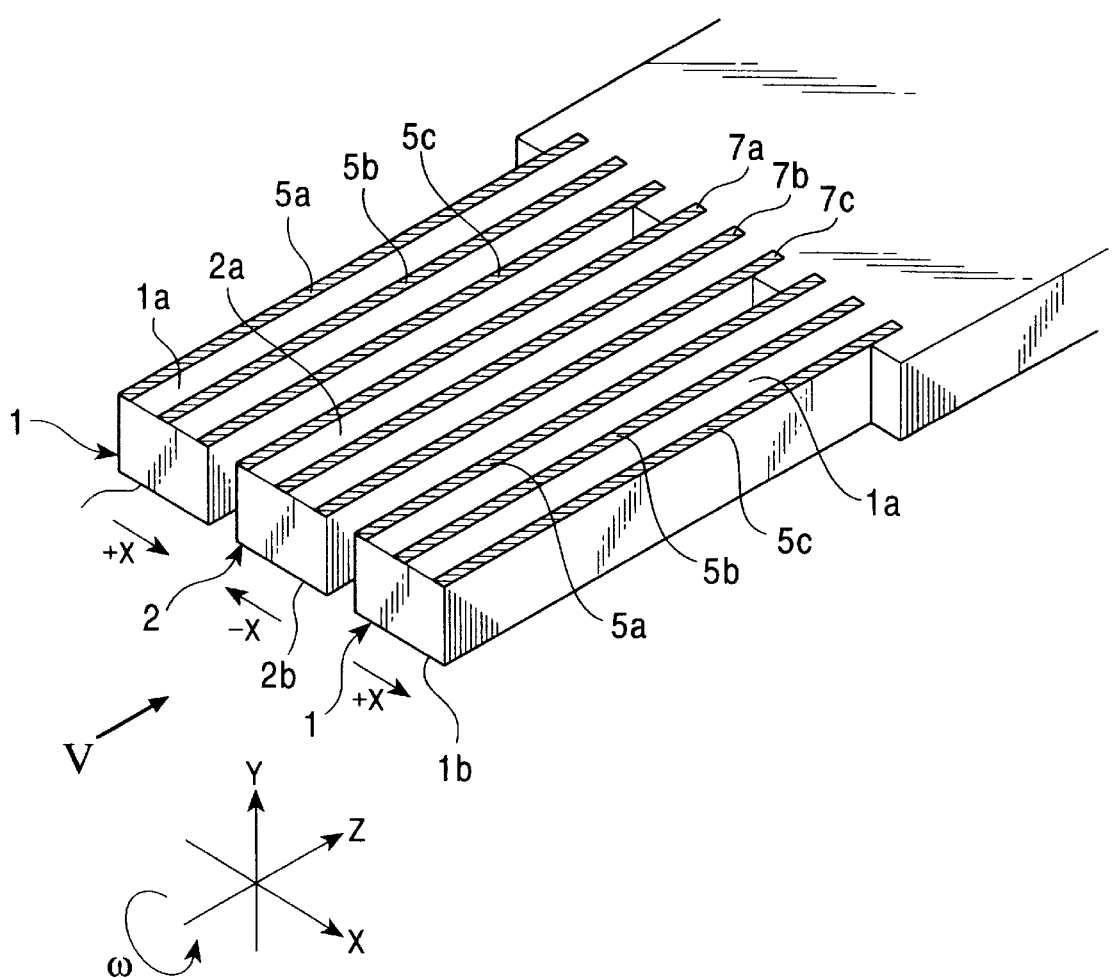
FIG. 4 is a perspective view showing an example of a conventional piezoelectric vibrator.
Figure 5A:
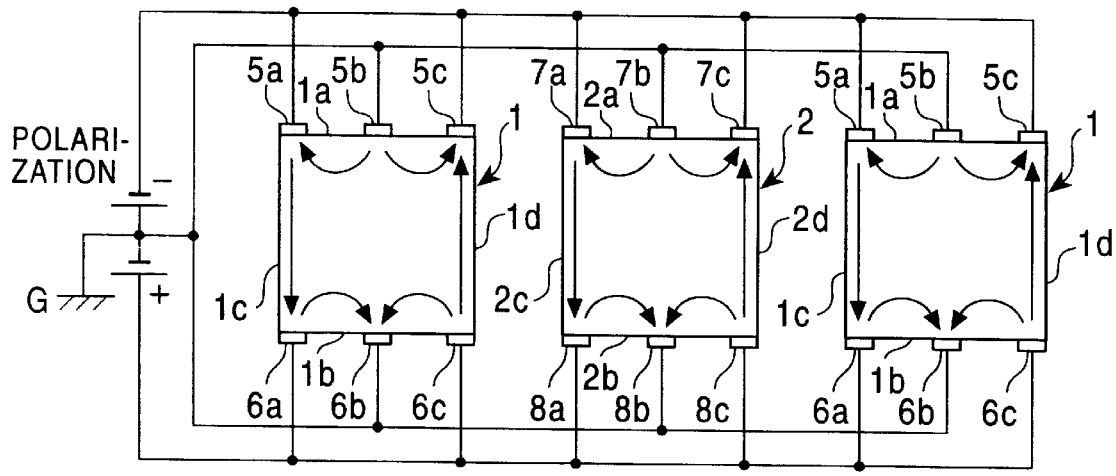
FIG. 5A is a front view of the piezoelectric vibrator shown in FIG. 4 when viewed in the direction of arrow V.
Figure 5B:
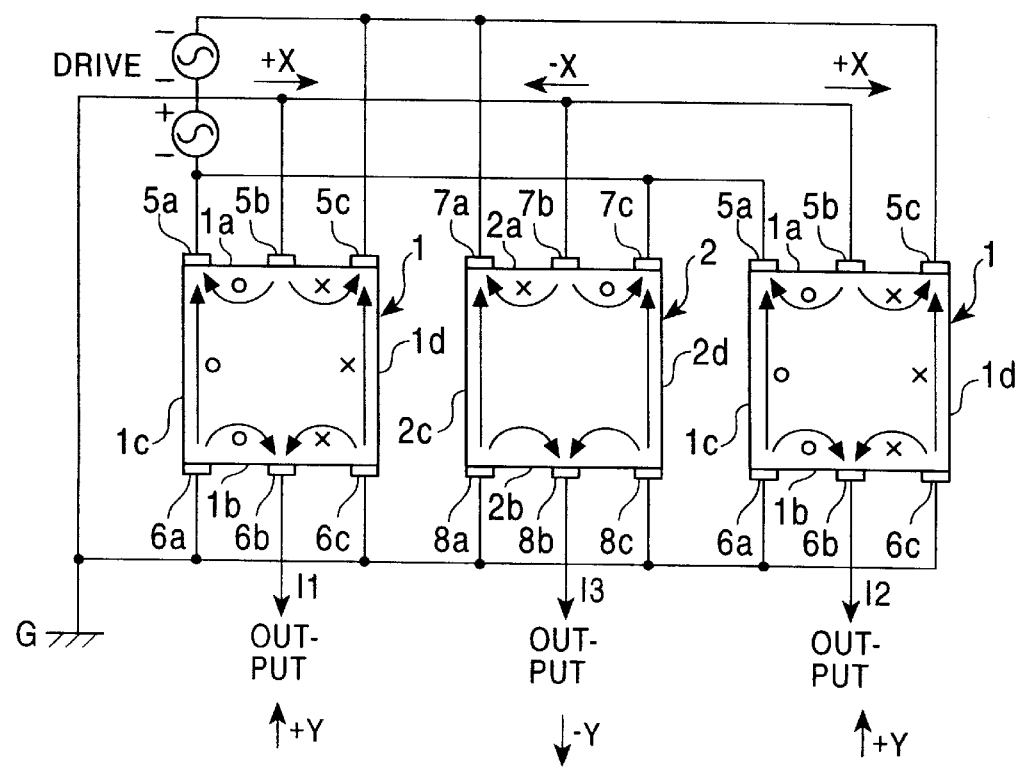
FIG. 5B is a front view showing a drive state.

As the second embodiment, FIG. 3A is a front view of a piezoelectric vibrator showing polarization directions and the electric wiring configuration of a drive system, and FIG. 3B is a connection diagram between a middle vibrator shown in FIG. 3A and the circuit configuration of a detection system.

The piezoelectric vibrator in FIG. 2A and the piezoelectric vibrator in FIG. 3A are different from each other in the dielectric polarization directions. More specifically, electrodes 10a, 10b, 11a, 11b, 10a and 10b are formed on the front surfaces (+Y side) of vibrators 10u, 10v, and 10w of a piezoelectric vibrator 10B shown in FIG. 3A, and electrodes 10c, 10d, 11c, 11d, 10c, and 10d are formed on the rear surface (−Y side). The dielectric polarizations of the vibrators 10u and 10w on both the sides are performed in four directions, i.e., the direction from the electrode 10a to the electrode 10b, the direction from the electrode 10a to the electrode 10c, the direction from the electrode 10d to the electrode 10b, and the direction from the electrode 10d to the electrode 10c. The dielectric polarization of the middle vibrator 10v is performed in four directions, i.e., the direction from the electrode 11b to the electrode 11a, the direction from the electrode 11b to the electrode 11d, the direction from the electrode 11c to the electrode 11d, and the direction from the electrode 11c to the electrode 11a.

As shown in FIG. 3A and FIG. 3B, only an AC drive signal source E is used as the drive system, and the same drive signal S are supplied to all the electrodes 10a, 10b, 11a, and 11b on the front surfaces (+Y side) of the vibrators 10u, 10v, and 10w.

The electrodes 10c, 10d, 11c, and 11d on the rear surfaces (−Y side) of the vibrators 10u, 10v, and 10w are used as detection electrodes. In FIG. 3B, of the vibrators 10u, 10v, and 10w, only the middle vibrator 10v is shown as in the above description. The electrodes 11c and 11d of the middle vibrator 10v are shown in FIG. 3B as detection electrodes.

As shown in FIG. 3B, the detection system of this gyroscope is constituted by two I/V conversion means 40 and 41 and one differential amplification means 50.

The I/V conversion means 40 and 41 have the same configuration as that of the I/V conversion means 20 and 21. Therefore, the electrodes 11c and 11d of the middle vibrator 10v are set at a reference potential Vref by imaginary ground (imaginary short circuit) of operational amplification means 40A and 41A constituting the I/V conversion means 40 and 41.

The electrodes 10c and 10d on the output sides of the vibrators 10u and 10w on both the sides may constitute a detection system constituted by the I/V conversion means 40 and 41 and the differential amplification means 50 as in the first embodiment. The electrodes 10c and 10d may also be directly connected to the reference potential Vref.

The differential amplification means 50 is mainly constituted by an operational amplifier 50A such as an op-amplifier, and a resistor R5 is arranged between an operational amplifier 50A and an output terminal 50c of the operational amplifier 50A. A non-inversion terminal (+ terminal) 50b is connected to the reference potential Vref through a resistor R6. An output terminal 40c of the operational amplifier 40A of the I/V conversion means 40 and the operational amplifier (− terminal) 50A of the operational amplifier 50A are connected through a resistor R3. An output terminal 41c of the operational amplification means 41A of the I/V conversion means 41 and the non-inversion terminal 50b of the operational amplifier 50A are connected through a resistor R4.

When a drive signal S is supplied to the electrodes 10a, 10b, 11a, and 11b on the front sides of the vibrators 10u, 10v, and 10w, the vibrators 10u, 10v, and 10w are vibrated.

As shown in FIG. 3A, in each of the vibrators 10u, 10v, and 10w, dielectric polarization directions are opposite from each other on the electrode 10a (11a) side and on the electrode 10b (11b) side. For this reason, when a AC drive signal which is (+) at a certain point of time is supplied to the respective electrodes, if plus distortion o occurs on the front surfaces of the vibrators 10u and 10w, minus distortion x occurs on the electrode 11a side. On the front surface of the middle vibrator 10v, minus distortion x occurs on the electrode 11a side, and plus distortion o occurs on the electrode 11b side. Therefore, at a certain point of time shown in FIG. 3B, bending vibration occurs such that the amplitude directions of the vibrators 10u and 10w on both the sides become a +X direction, and the amplitude of the middle vibrator 10v is performed in a −X direction. More specifically, also in the piezoelectric vibrator 10B described in the second embodiment, the vibrators 10u and 10w on both the sides and the middle vibrator 10v can be vibrated with phases opposite from each other in the X directions.

At this time, current outputs Ic and Id can be detected from the electrodes 11c and 11d on the detection side. However, in the second embodiment, unlike the first embodiment, in the vibrator 10v, the dielectric polarization directions are opposite from each other on the electrode 10a (11a) side and on the electrode 10b (11b) side. For this reason, the current output Ic of the electrode 11c and the current output Id of the electrode 11d are in-phase.

X-direction in-phase drive components generated by driving the vibrator 10v in the X directions are also superposed on the current outputs Ic and Id.

The current outputs Ic and Id detected from the electrodes 11c and 11d are converted into voltage outputs Vc and Vd by the I/v conversion means 40 and 41.

Here, as in the first embodiment, the converted voltage outputs Vc and Vd can be expressed by: Vc=−Ic·R2 and Vd=−Id·R1. If R1=R2=R is satisfied, Vc=−Ic·R and Vd=−Id·R are satisfied.

These voltage outputs Vc and Vd output from the I/V conversion means 40 and 41 are subtracted from each other and then amplified in the differential amplification means 50, and an output Vout from the differential amplification means 50 is given by:

$$V_{out} = (V_c - V_d) \cdot R5/R3$$
$$= -((-I_c \cdot R) - (-I_d \cdot R)) \cdot R5/R3$$
$$= -(I_d - I_c) \cdot R \cdot R5/R3.$$

Since the phases of the current output Ic and the current output Id are equal to each other, the Vout is obtained by amplifying ((R·R5/R3) times) the difference between the current output Ic and the current output Id. This result is the same as that obtained in the first embodiment.

More specifically, in the differential amplification means 50, the current output Id and the current output Ic are subtracted from each other, so that in-phase drive components generated by vibration in the X direction can be canceled. Therefore, an angular velocity which is proportional to initial Coriolis force can be detected at high accuracy.

According to the present invention described above, even if the ground electrodes (central electrodes) on the front surfaces and the rear surfaces of the vibrators are removed, the vibrators can be vibrated, and outputs which are proportional to Coriolis force can be detected.

Therefore, the steps in manufacturing electrodes can be made easy. Since the number of electrodes can be reduced, wiring for the vibrators is not cumbersome.

Since the interval size (creeping distance) between electrodes can be sufficiently assured by arranging a central electrode, a dielectric breakdown voltage between the electrode can be increased. Therefore, a high voltage can be applied across the electrodes. In addition, since discharge does not easily occur when a high voltage is applied, sufficient dielectric polarization can be performed.

What is claimed is:

1. A drive detection device for a gyroscope including at least one vibrator which has a pair of drive electrodes extending in a longitudinal direction on one surface and a pair of detection electrodes extending in the longitudinal direction on an opposing surface and which is dielectric-polarized in one direction between one surface and the opposing surface, comprising: a drive system to give drive signals opposite from each other in phase to the pair of drive electrodes; and a detection system including a pair of I/V conversion mechanisms to respectively convert current outputs detected from the pair of detection electrodes into voltage outputs and an addition mechanism to add voltage outputs of the I/V conversion mechanisms.

2. A drive detection device for a gyroscope according to claim 1, wherein dielectric polarization directions of adjacent vibrators are opposite from each other in phase.

3. A drive detection device for a gyroscope according to claim 1, wherein one surface of each vibrator is constituted by only a drive electrode, and the opposing surface is constituted by only a detection electrode.

4. A drive detection device for a gyroscope including at least one vibrator which has first and second drive electrodes extending in a longitudinal direction on one surface and first and second detection electrodes extending in the longitudinal direction on an opposing surface and which is dielectric-polarized between the surface and the opposing surface, comprising: a circuit of a drive system to generate drive signals being in-phase to the first and second drive electrodes; and a detection system having a pair of I/V conversion mechanisms to respectively convert current outputs detected from the first and second detection electrodes into voltage outputs and a differential amplification mechanism to subtract voltage outputs of the I/V conversion mechanisms from each other.

5. A drive detection device for a gyroscope according to claim 4, wherein a piezoelectric vibrator is formed such that a dielectric polarization direction between the first drive electrode and the first detection electrode and a dielectric polarization direction between the second dielectric electrode and the second detection electrode are opposite from each other in phase, and is formed such that a dielectric polarization direction between the first drive electrode and the second drive electrode and a dielectric polarization direction between the first detection electrode and the second detection electrode are opposite from each other in phase.

6. A drive detection device for a gyroscope according to claim 4, wherein dielectric polarization directions of adjacent vibrators are opposite from each other in phase.

7. A drive detection device for a gyroscope according to claim 4, wherein one surface of each vibrator is constituted by only a drive electrode, and the opposing surface is constituted by only a detection electrode.

* * * * *